US008334496B2

United States Patent
Guellec et al.

(10) Patent No.: US 8,334,496 B2
(45) Date of Patent: Dec. 18, 2012

(54) 3D ACTIVE IMAGING DEVICE WITH A CIRCUIT FOR INTEGRATING AND TIMESTAMPING INCIDENT RADIATION ON A PHOTOSENSITIVE ELEMENT

(75) Inventors: Fabrice Guellec, Saint Paul de Varces (FR); Michaël Tchagaspanian, Saint Ismier (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 192 days.

(21) Appl. No.: 12/842,299

(22) Filed: Jul. 23, 2010

(65) Prior Publication Data
US 2010/0301193 A1 Dec. 2, 2010

Related U.S. Application Data (63) Continuation of application No. PCT/FR2009/050145, filed on Jan. 30, 2009.

(30) Foreign Application Priority Data

Feb. 1, 2008 (FR) ..................... 08 50652

(51) Int. Cl.
- H03F 3/08 (2006.01)
- G01C 3/08 (2006.01)
- G06G 7/18 (2006.01)

(52) U.S. Cl. .................... 250/214 R; 356/5.01; 327/337

(58) Field of Classification Search ............... 250/208.1, 250/214 R, 214.1, 221, 214 A, 559.1, 559.19, 250/559.2, 559.21, 559.29, 559.31, 559.38, 250/559.39, 206, 208.2; 327/514, 337, 342, 327/336; 356/5.04, 5.1, 4.02, 5.02, 4.01, 356/3.01, 5.01, 12, 213, 215, 218, 219, 226, 356/229, 230
See application file for complete search history.

(56) References Cited

U.S. PATENT DOCUMENTS

| 5,214,274 A * | 5/1993 | Yang .......................... 250/208.1 |
| 6,133,989 A | 10/2000 | Stettner et al. |
| 6,522,395 B1 | 2/2003 | Bamji et al. |
| 6,614,286 B1 * | 9/2003 | Tang .............................. 327/337 |
| 6,661,500 B1 | 12/2003 | Kindt et al. |
| 7,206,062 B2 * | 4/2007 | Asbrock et al. .............. 356/4.03 |
| 2002/0036765 A1 | 3/2002 | McCaffrey et al. |
| 2004/0233416 A1 | 11/2004 | Doemens et al. |
| 2006/0007422 A1 | 1/2006 | Dimsdale |

OTHER PUBLICATIONS

Ian M. Baker, et al., "*A Low-Noise Laser-Gated Imaging System for Long-Range Target Identification*," Proceedings of SPIE, vol. 5406, Infrared Technology and Application XXX, Aug. 30, 2004, pp. 133-144 (Abstract Only).

Mark K. Browder, et al., "*Three-Dimensional Imaging Sensors Program*," Proceedings of SPIE, vol. 4377, Laser Radar Technology and Application VI, Sep. 19, 2001, pp. 73-83 (Abstract Only).

* cited by examiner

*Primary Examiner* — Que T Le
*Assistant Examiner* — Jennifer Bennett
(74) *Attorney, Agent, or Firm* — Burr & Brown (57) ABSTRACT

The invention relates to a device comprising a photosensitive element producing an electric charge as a function of the radiation incident thereon and a charge integrator connected to the photosensitive element and converting the charge to a voltage. According to the invention, the device comprises a comparator capable of comparing the voltage delivered by the integrator with a threshold voltage, and a memory unit for storing the instant when the voltage delivered by the integrator exceeds the threshold voltage.

9 Claims, 6 Drawing Sheets

3D ACTIVE IMAGING DEVICE WITH A CIRCUIT FOR INTEGRATING AND TIMESTAMPING INCIDENT RADIATION ON A PHOTOSENSITIVE ELEMENT

FIELD OF THE INVENTION

The present invention relates to the field of 3D active imaging and, more especially, elementary detectors, or pixels, in arrays which form part of detectors used for this type of imaging.

DESCRIPTION OF THE RELATED ART

Systems used in the field of 3D active imaging such as, for example, Laser Detection and Ranging (LADAR) systems, emit brief bursts of electromagnetic radiation in the form of a pulse by using a laser, for instance, and use an imaging device which is sensitive in the emitted spectral band in order to detect the flux reflected by obstacles located on the path of the emitted radiation.

These systems combine the detected reflected flux with temporal information such as, for example, sequencing or timestamping information, thereby making it possible to determine range information. This range information is classically produced by means of time-to-distance conversion depending on the pulse's round-trip delay (the propagation velocity of the pulse is known) by using the formula d=c t/2, where d is distance, c is the pulse propagation velocity, and t is the time which the pulse takes to complete the outward and inward trip.

Usually, in order to obtain a 3D image of a scene, 3D active imaging systems employ a technique referred to as "image slicing" such as that described, for example, in the document by I. Baker, S. Duncan and J. Copley "*A low noise, laser-gated imaging system for long range target identification*", Proceedings of SPIE, vol. 5406, pages 133-144.

Figure 1:
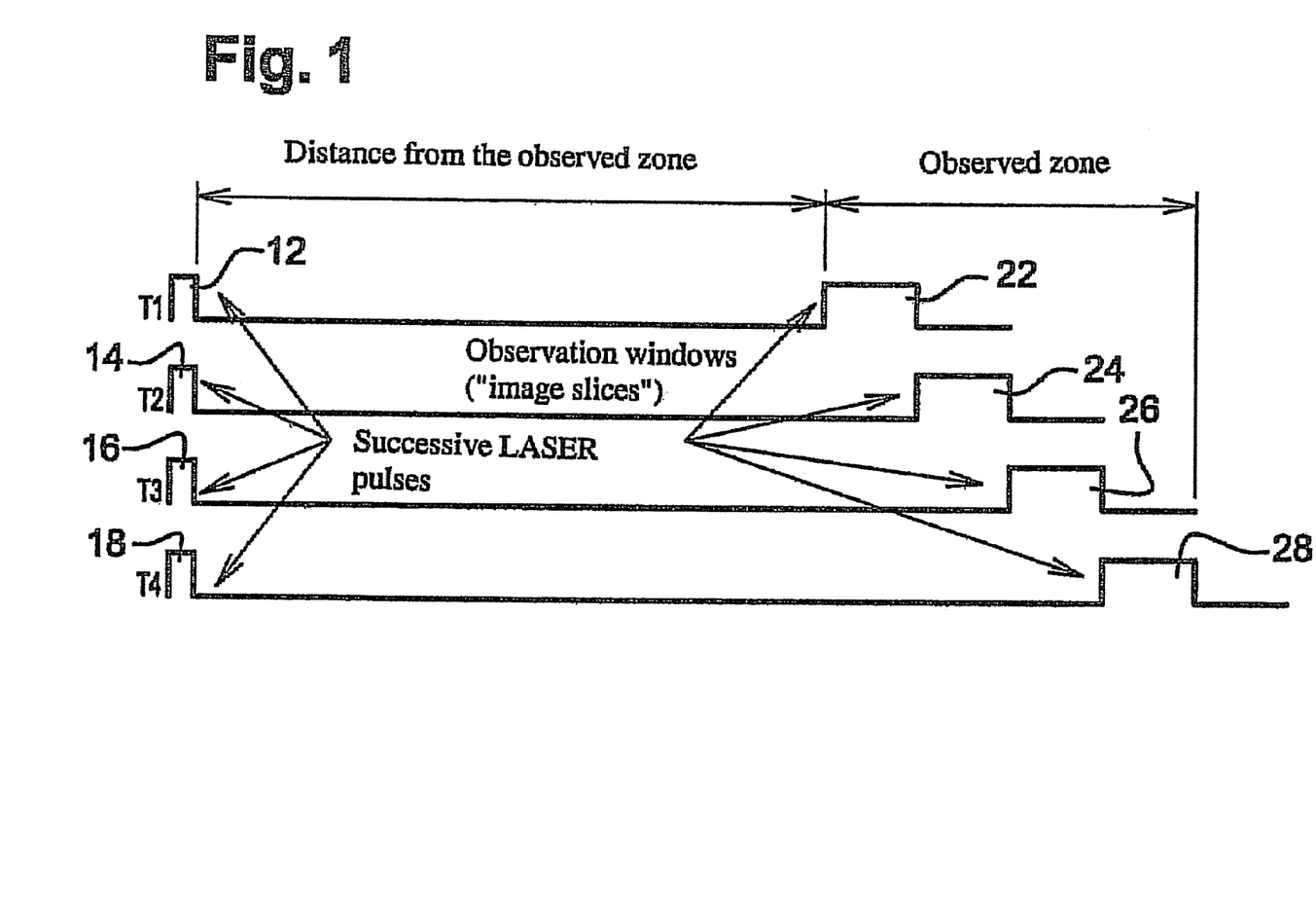
FIGS. 1 and 2 illustrate 3D active imaging using the image slicing discussed in the preamble.
Figure 2:
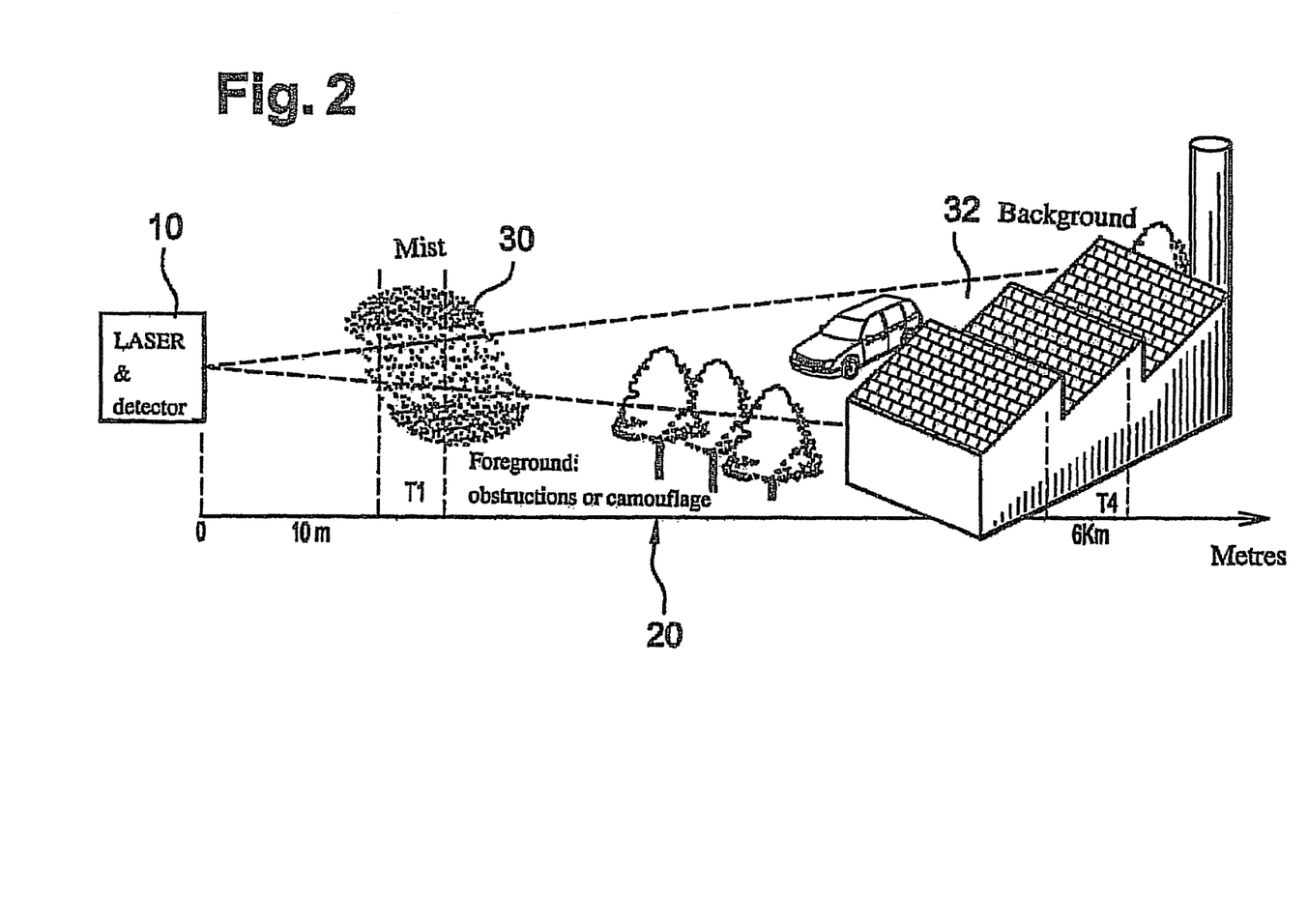

The principle of this technique is illustrated in FIGS. 1 and 2. The emitting part of a system 10 transmits a series of successive laser pulses 12-18 towards a scene which is to be observed 20. After each pulse 12-18, the detecting part of system 10 picks up the flux reflected by scene 20 during a time window 22-28 which is controlled by the system.

The delay between generating a laser pulse 12-18 and the start of the corresponding time window 22-28 is adjusted by the system depending on the viewing distance of scene 20 and the duration of the window adjusts the observation depth.

Thus, for example, first time window 22 is adjusted to observe scene 20 at a distance of 5 kilometers and over a depth of 1 meter, which corresponds here to one image slice T1 of a cloud of mist 30, whereas last time window 28 is adjusted to observe scene 20 at a distance of 6 kilometers over a depth of 1 meter which corresponds here to one image slice T4 of building 32.

In such a 3D imaging system which uses image slicing, resolution is limited by the width of time windows 22-28. A large number of pulse/window pairs must be generated in order to obtain high resolutions. However, the larger the number of pulses generated, the longer the time needed to reconstitute the 3D image becomes and this is not compatible with certain applications, especially in the field of real-time 3D imaging. In addition, multiplying the number of pulses has an adverse effect on the discretion which is sought-after in stealthy systems.

Other 3D imaging systems commonly referred to as "3D flash" systems only use a single laser pulse. Such systems are, for example, described in document U.S. Pat. No. 6,133,989. In this type of system, the intensity of the flux reflected by the scene must be measured and timestamped independently, for each pixel which forms part of the flux detector, at the instant when the pulse returns.

Several techniques to independently timestamp the instant when the pulse returns (more widely referred to by the expression "time-of-flight measurement") have been developed. For example, time-of-flight measurement is realised by filtering in each pixel by measuring the maximum amplitude of the reflected flux detected by the pixel (see, for instance, the document by M. Browder et al. "3*D imaging laser radar*", Proceedings of SPIE, vol. 4377, pages 73-83) or even by sampling the pulse multiple times (see, for example, document U.S. Pat. No. 7,206,062).

However, measuring the maximum amplitude by filtering the reflected flux does not make it possible to perforin conventional flux measurement by current integration. The 2D performance of an imaging system which uses such a technique is therefore poor. In addition, such a system is relatively unsuitable for realising multimode detection which is capable of performing both passive 2D imaging (i.e. without emitting radiation), 2D active imaging (i.e. emitting radiation but without distance measurement) and 3D active imaging.

Not only this, time-of-flight measurement by multiple sampling comes up against technical design problems. In fact, it is difficult to store a large number of samples over the surface area of a single pixel. Besides, the sampling frequency depends heavily on the technology used to implement the circuitry.

Lastly, using this technique results in considerable power consumption which is not compatible with certain applications, especially portable imaging systems. Consequently, systems which use this technique usually have a time resolution which is limited to measuring the time of flight.

Document US-A-2006/007422, for example, also discloses a 3D imaging system such as that shown in FIG. 5 in that document wherein the charge produced by a detector is initially amplified (unit 152). The output of amplifier 152 is connected firstly to an integrator (unit 164) which integrates the amplified signal and secondly to a comparator (unit 154) which compares the amplified signal with a threshold value in order to determine the instant when a pulse reaches the detector. Charge measurement and time-of-flight measurement are thus performed in parallel, with the integrator and the comparator being connected in parallel. This circuit has several drawbacks such as the need for a large number of components and the need to have an amplifier 152 which is sufficiently linear over the entire range of input signals. In practice, at least three operational amplifiers are required in order to implement the input amplifier, comparator and integrator respectively. Realising operational amplifiers generally requires a considerable area of silicon and the overall dimensions of such a circuit are generally too large for it to be used in modern array architectures. In addition, the power consumption of such a circuit is generally high and this generates additional noise which degrades measurement quality.

SUMMARY OF THE INVENTION

The object of the present invention is to solve the above-mentioned problems by proposing a device intended for 3D active imaging which allows simultaneous measurement of the reflected flux and time of flight while allowing multimode use and does not entail prejudicially high power consumption.

To achieve this, the object of the invention is a photosensitive element which produces an electric charge as a function of the radiation incident thereon and a charge integrator which is connected to a photosensitive element and converts the charge to a voltage. Generally speaking, the photosensitive element supplies a current to the input of the integrator. This current is integrated across terminals of a capacitor of the integrator and the voltage across the terminals of this capacitor constitutes the integrator's output voltage. The output voltage of the integrator is an image of the electric charge produced by the photosensitive element.

According to the invention, this device comprises a comparator capable of comparing the voltage delivered by the integrator with a threshold voltage, and a memory unit for storing the instant when the voltage delivered by the integrator exceeds the threshold voltage.

In other words, the reflected flux is measured conventionally by using, for instance, a photodiode or a phototransistor coupled to an integrator. The comparator at the output of the integrator makes it possible to detect an increase in the voltage delivered by the integrator and this increase denotes incident radiation on the photosensitive element. The time during which the comparator's threshold value is exceeded thus makes it possible to determine the time of flight.

In addition, the integrator and the comparator are connected in series. The integrator constitutes the input stage of the device, just after the photosensitive element, and performs current-to-voltage conversion (the signal output by the integrator is a voltage) which is required for the comparator. In other words, there is no need to provide a current-to-voltage conversion circuit, such as a dedicated amplifier, between the photosensitive element and the comparator. In practice, this obviates the need to implement an operational amplifier, in contrast to the device described in Document US-A-2006/007422.

It should also be noted that it is not necessary to provide linear amplification of the charges produced by the photosensitive element and that this simplifies the design of the circuit. In fact, realising linear amplification is usually difficult; it demands a large surface area of silicon and considerable power. Furthermore, realising the current-to-voltage conversion function through the integrator makes it possible to overcome the bandwidth and noise sensitivity problems associated with a converter such as an amplifier.

What is more, using a conventional integrator allows multimode use because the comparator does not disturb the overall operation of flux measurement. Furthermore, the dedicated components for measuring the time of flight are simple components (comparator and memory) which do not consume much energy.

According to one particular embodiment of the invention, the integrator has variable amplification gain with the integrator's amplification gain before the instant when the threshold voltage is exceeded being larger than the amplification gain after the instant when the voltage is exceeded. More especially, the integrator comprises an operational amplifier mounted in inverse feedback by a first capacitor and a second switchable capacitor, with the first capacitor having a capacitance which is less than that of the second capacitor and the second capacitor being capable of being connected in parallel to the first capacitor after the instant when the threshold voltage is exceeded.

The capacitance of the first capacitor is selected depending on the desired accuracy when determining the instant when the threshold voltage is exceeded.

In other words, the charge on the input of the integrator is initially converted into a voltage with significant amplification gain. In fact, the integrator's output voltage rapidly reaches the threshold voltage, thus allowing accurate detection of the time of flight. Once the threshold voltage has been reached, the gain of the integrator diminishes so as to integrate all the charges produced by the photosensitive element.

Thus, in the case of an integrator consisting of an amplifier which is feedback stabilised by a set of capacitors, the amplifier is feedback stabilised by a capacitance which initially has a low value (because the integrator's output voltage across the terminals of the set of capacitors increases faster, the smaller the overall capacitance of this set of capacitors is). The time constant of the integrator is therefore small and so the threshold value on its output is reached quickly. The time-of-flight measurement is therefore more accurate.

Also, once this measurement has been made, a capacitance having a larger value is used to feedback stabilise the amplifier. This capacitance is sized so as to allow integration of all the charges produced by the incident radiation on the photosensitive element. It should be noted that the charges integrated by the first capacitor are not lost but are transferred to the final capacitance of the capacitors which are connected in parallel.

According to one particular embodiment of the invention, the device comprises a module for estimating a detection delay which corresponds to the instant when the radiation on the photosensitive element starts and the threshold-exceeded instant as a function of the voltage delivered by the integrator and a module for correcting the instant when the threshold is exceeded by subtracting the determined detection delay from it. More especially, the module for estimating the detection delay is capable of estimating it in accordance with the following equation:

$$T_{det} = \frac{\alpha}{a \cdot \Delta V_{int} + b} + \beta$$

where $\Delta V_{int}$ is a variation in voltage corresponding to the incident radiation on the photosensitive element and a, b, $\alpha$, and $\beta$ are predetermined parameters.

In other words, there is time-of-flight detection latency. In fact, there is a certain delay between the start of the incident flux on the photosensitive element, which is the real time of flight, and measurement of the latter when the threshold value of the comparator is exceeded.

It is possible to estimate this latency according to the characteristics of the integrator and of the voltage delivered by the latter. A time-of-flight measurement correction can thus be made in order to improve the temporal accuracy of the device.

According to one particular embodiment of the invention, the threshold voltage of the comparator is adjusted to a voltage which is substantially equal to:

$$V_{comp} + V_{offset}^{CTIA} + V_{offset}^{comparator}$$

where $V_{comp}$ is a predetermined voltage, $V_{offset}^{CTIA}$ is an integrator offset voltage and $V_{offset}^{comparator}$ is a comparator offset voltage.

In other words, the integrator and the comparator are not perfect. In particular, the voltages which they deliver are contaminated by offset error which is a source of time-of-flight measurement inaccuracy. Incorporating the value of these offsets in the threshold voltage of the comparator eliminates their effects on time-of-flight measurement.

More especially, the device comprises
a first switch capable of connecting the output of the comparator to the latter's threshold voltage input,
a third capacitor connected between the threshold voltage input of the comparator and the first terminal of a second and a third switches, the second terminal of the third capacitor being connected to ground and to a predetermined voltage respectively, The threshold voltage of the comparator is adjusted by closing the first and second switches and by opening the third switch and then opening the first and second switches and closing the third switch.

In other words, the real offsets of the integrator and the comparator are obtained in the threshold voltage thanks to a simple procedure to initialise the device. This does away with any factory calibration procedure while ensuring that real offset errors are compensated.

The object of the invention is also an imaging array which comprises a plurality of devices of the above-mentioned type.

The object of the invention is also a 3D active imaging system which comprises a controllable source of radiation and a detection array capable of detecting radiation from the source and reflected by obstacles. According to the invention, the detection array comprises a plurality of devices of the above-mentioned type.

BRIEF DESCRIPTION OF THE DRAWINGS

The present invention will be made more readily understandable by the following description which is given merely by way of example and relates to the accompanying drawings in which identical references denote identical or analogous components and in which.

DESCRIPTION OF THE PREFERRED EMBODIMENTS

Figure 3:
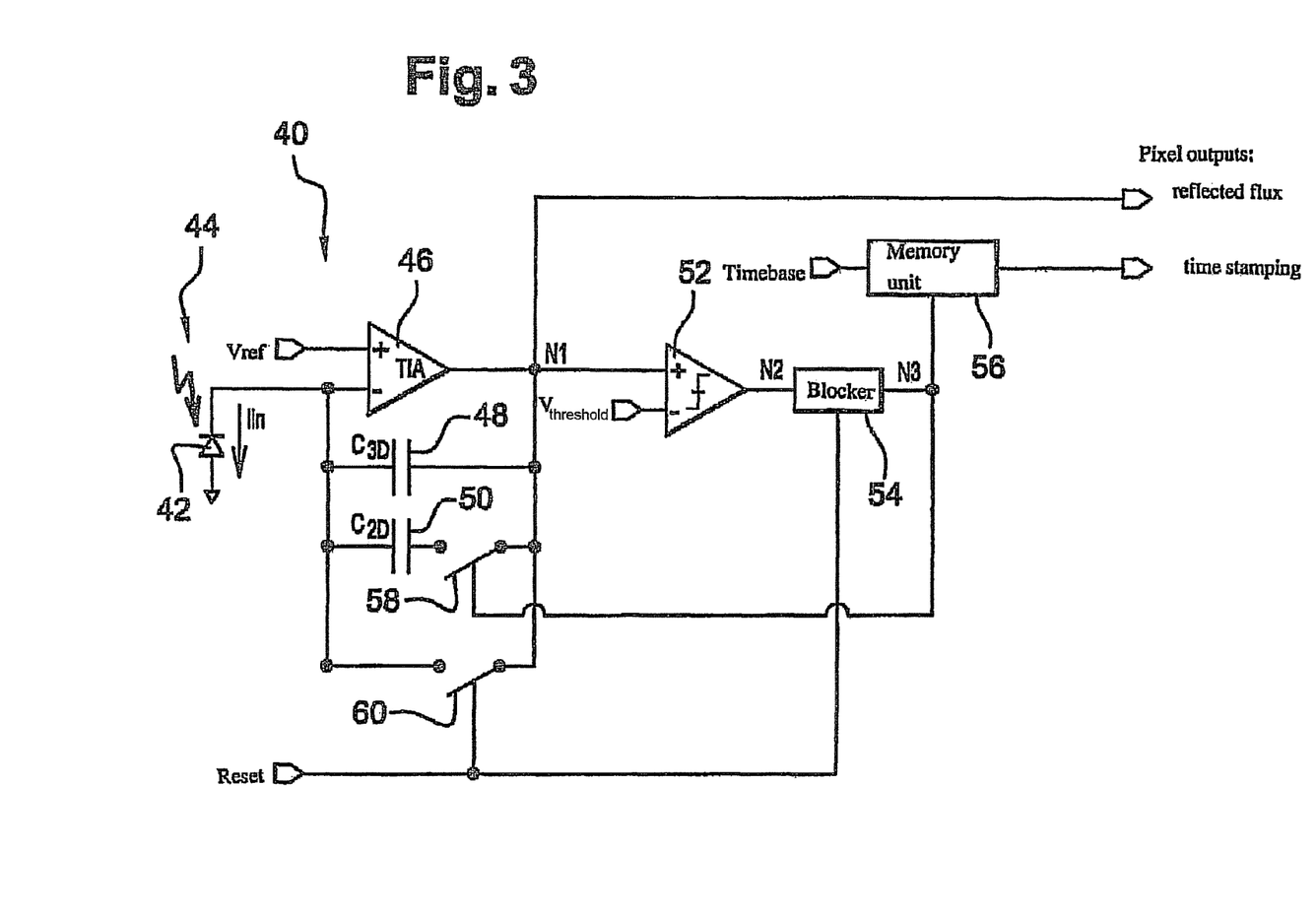
FIG. 3 is a schematic view of a first embodiment of the pixel according to the invention.

In FIG. 3, a device or pixel 40 according to the invention comprises a photodiode 42 capable of receiving incident radiation 44 and producing, as a function of the latter, a current "$I_{in}$".

The anode of photodiode 42 is connected to ground and its cathode is connected to the inverting (−) terminal of operational amplifier 46 which forms an integrator with two capacitors 48, 50 which are feedback stabilised between the output of amplifier 46 and the inverting (−) terminal of the amplifier.

Amplifier 46 also receives, on its non-inverting (+) terminal, a constant voltage $V_{ref}$ and outputs a voltage $V_{int}$ which is proportional to the electric charge produced by photodiode 42 due to the incident radiation 44 thereon.

Pixel 40 also comprises a comparator 52, the positive terminal (+) of which is connected to output $V_{int}$ of amplifier 46 and the negative terminal (−) of which receives a constant predetermined threshold voltage $V_{threshold}$. Comparator 52 therefore outputs the voltage difference between its positive terminal (+) and its negative terminal (−).

Blocker 54 is also provided on the output of comparator 52. The output of blocker 54 switches from a first voltage to a second voltage which exceeds the first voltage at the instant when voltage $V_{int}$ delivered by amplifier 46 exceeds threshold voltage $V_{threshold}$. Once this switchover has occurred, the output of blocker 54 remains latched at the second voltage until initialisation is subsequently performed.

A memory unit 56 is connected to the output of blocker 54 and stores the instant at which the output of blocker 54 switched on the basis of a timebase received from a clock (not shown).

Also, a first switch 58 is provided in series with second capacitor 50. Switch 58 is driven by the output of blocker 54 and closes when the latter's output switches from the first voltage to the second voltage, i.e. at the instant when voltage $V_{int}$ delivered by amplifier 46 exceeds threshold voltage $V_{threshold}$. The second capacitor 50 is thus connected in parallel with the first capacitor 48.

Advantageously, first capacitor 48 has a low capacitance $C_{3D}$. The term "low" here is taken to mean capacitance values which allow the desired temporal accuracy for the time of flight and the minimal current level on the input of the integrator which the system must be able to handle.

The current produced by photodiode 42 is thus integrated with high gain so that output $V_{int}$ of amplifier 46 very quickly exceeds threshold voltage $V_{threshold}$ when there is incident radiation on the photodiode. Once the threshold has been exceeded, i.e. once the time of flight has been timestamped, connection of the second capacitor is established, with the capacitance $C_{2D}$ of the latter being sized to allow integration of all the incident flux.

Finally, the pixel comprises a second rest-switch 60 which is connected in parallel with first and second capacitors 48 and 50 and is driven by a zero reset signal. This reset signal also controls initialisation of blocker 54. During initialisation, first and second switches 58, 60 are closed, thus discharging first and second capacitors 48, 50, and the output of blocker 54 is switched to the first voltage.

Thus, the output of amplifier 46 provides the measured incident radiation on photodiode 42 and the output of memory unit 56 provides a timestamp $TOF_{measured}$ for the start of the incident radiation on photodiode 42.

Figures 4, 5:
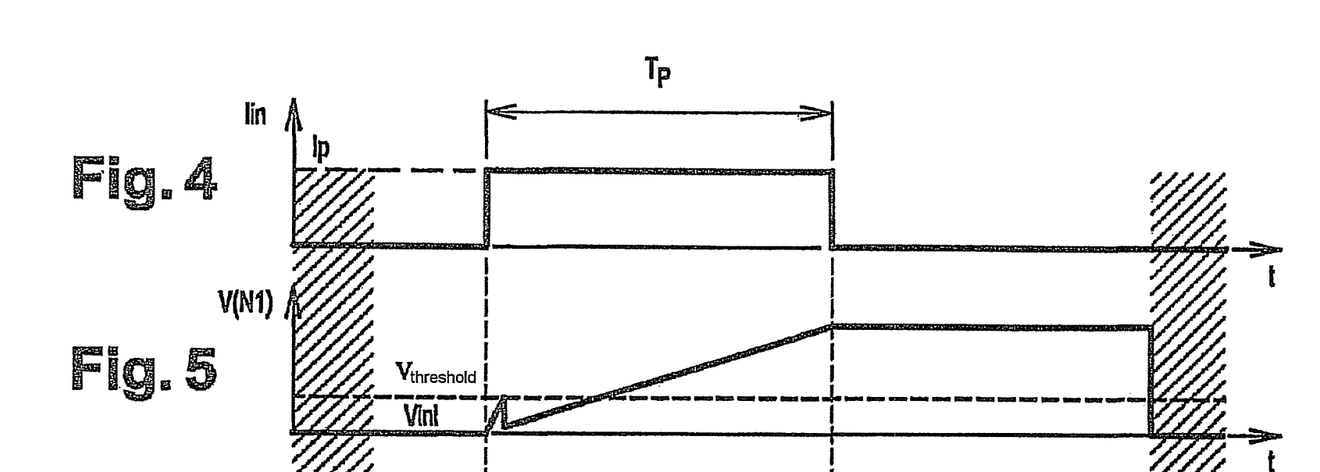
FIGS. 4 to 6 are timing diagrams of the signals in the pixel in accordance with the invention during one read frame.
Figure 6:
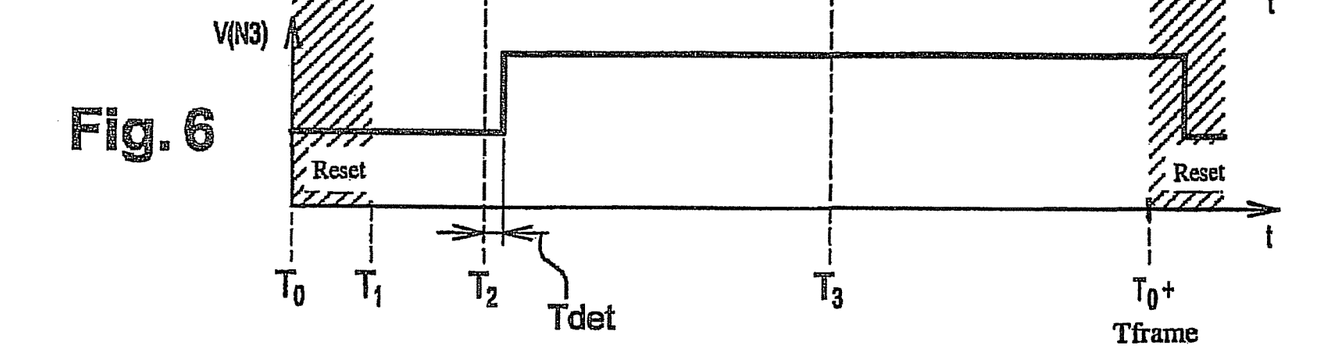

FIGS. 4 to 6 show an example of the signals in pixel 40 as a function of time. These Figures illustrate, for example, a time window 22-28 as described in relation to FIGS. 1 and 2 during which flux reflected by the scene is incident on photodiode 42.

For the sake of clarity, it is assumed here that the incident radiation on photodiode 42 is in the form of a rectangular pulse. Photodiode 42 thus produces a rectangular pulse having an amplitude $I_p$ and a duration $T_p$, as illustrated in FIG. 4. Note that the duration $T_p$ of the rectangular pulse is the same as that of the emitted laser pulses.

The time window comprises an initialisation interval between $T_0$ and $T_1$ during which capacitors 48, 50 are discharged and the output of blocker 54, shown in FIG. 6, is adjusted to the first voltage.

Photodiode 42 starts producing current due to the effect of the incident radiation at instant $T_2$, instant $T_2$ being the real time of flight $TOF_{real}$ of the flux reflected by the scene.

Integration of current $I_{int}$ starts at this instant $T_2$. Voltage $V_{int}$ on the output of amplifier 46, shown in FIG. 5, then increases rapidly because of the low capacitance value $C_{3D}$ of capacitor 48.

Voltage $V_{int}$ on the output of amplifier 46 reaches the threshold voltage $V_{threshold}$ of comparator 52 at instant $T_2+T_{det}$, the instant at which the output of blocker 54 switches to the second voltage, thereby timestamping the time of flight.

At this same instant, switch 58 is closed, thus connecting second capacitor 50 in parallel with first capacitor 48. The charge initially stored in the latter is then transferred to the total capacitance formed by both capacitors 48, 50 connected in parallel and integration of the current continues at a slower rate.

The output voltage of amplifier 46 at the end of the time window therefore provides a measure of the total charge produced by the photodiode.

Similarly, instant $T_2+T_{det}$ provides measured timestamping of the time of flight.

Note that timestamping of the time of flight is affected by inaccuracy, namely delay $T_{det}$.

Assuming that the initial integrator (formed by amplifier 46 and first capacitor 48) is ideal, detection delay $T_{det}$ depends on the difference between the threshold voltage $V_{threshold}$ of the comparator, the initial value $V_{ini}$ which output voltage $V_{int}$ of the amplifier assumes before current integration, the capacitance $C_{3D}$ of first capacitor 48 and the amplitude $I_p$ of the current generated by photodiode 47 in accordance with the following equation:

$$T_{det} = \frac{C_{3D} \times (V_{seuil} - V_{ini})}{I_p} \quad (1)$$

Advantageously, capacitance $C_{3D}$ and threshold voltage $V_{threshold}$ are adjusted in order to minimise detection delay $T_{det}$. Thus, capacitance $C_{3D}$ is chosen to be as small as possible and threshold voltage $V_{threshold}$ is adjusted so that it is as close as possible to initial voltage $V_{ini}$.

However, minimising detection delay $T_{det}$ is limited by the feasibility of an integrator which uses a low value capacitance as well as by the noise margin of comparator 52.

In fact, to ensure satisfactory operation of the pixel described above, there is always a delay $T_{det}$ which limits the accuracy of time-of-flight timestamping and this can be a problem in certain applications.

Figure 7:
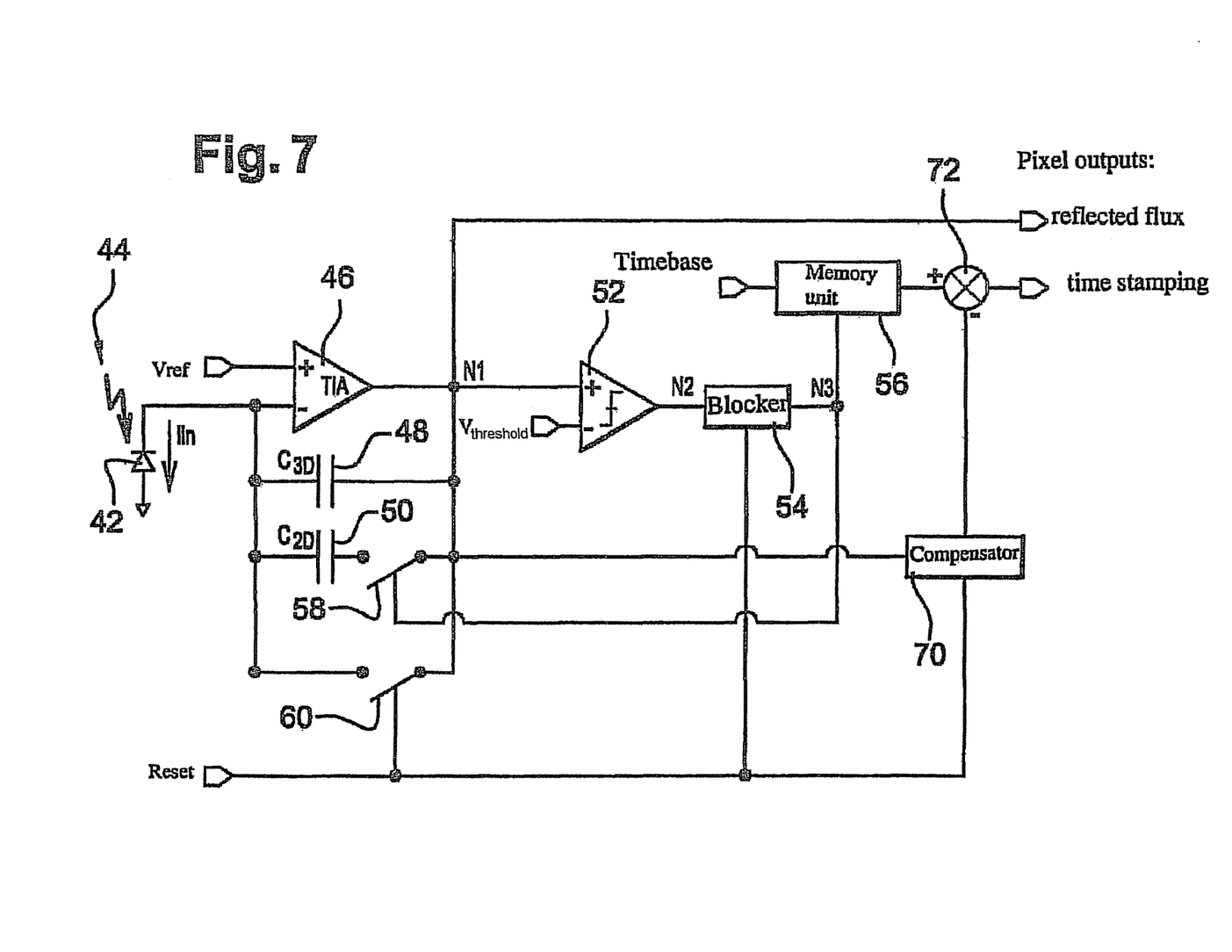
FIG. 7 is a schematic view of a second embodiment of the pixel according to the invention.

FIG. 7 is a schematic view of a second embodiment of the pixel according to the invention. This second embodiment differs from the first embodiment described in relation to FIG. 3 in that it also comprises a module 70 for correcting the timestamp stored in memory unit 56. This correction module 70 is, for example, implemented in logic circuitry by a processor or is realised in the integrated circuit which performs readout of photodiode 42.

Correction module 70 is connected to the output of amplifier 46 to measure the voltage $V_{int}$ on the latter. Module 70 estimates detection delay $T_{det}$ as a function of this voltage in accordance with the following equation:

$$T_{det} = \frac{\alpha}{a \cdot \Delta V_{int} + b} + \beta \quad (2)$$

where $\Delta V_{int}$ is a variation in voltage $V_{int}$ on the output of amplifier 46 between the end and the start of the time window and a, b, $\alpha$, and $\beta$ are predetermined parameters.

A subtractor 72 is also provided on the output of memory unit 56 in order to subtract the detection delay estimated by unit 70 from the value stored in unit 56.

In fact, as described earlier, the measured time of flight, namely that stored in memory unit 56, can be written as follows:

$$TOF_{measured} = TOF_{real} + T_{det} \quad (3)$$

By approximation and assuming the incident flux on photodiode 42 is in the form of a rectangular pulse, the detection delay can be written according to equation (1) or, more generally, in the form:

$$T_{det} = \alpha \cdot I_p + \beta \quad (4)$$

It has also been demonstrated that the amplitude $I_p$ of the current pulse produced by photodiode 42 can be written, as a function of the output voltage $V_{int}$ of amplifier 46, in the following form:

$$I_p = \frac{(C_{3D} + C_{2D}) \cdot (V_{int}(TOF_{real} + T_p) - V_{int}(TOF_{real}))}{T_p} \quad (5)$$

However, the voltage difference $V_{int}(TOF_{real}+T_p) - V_{int}(TOF_{real})$, taken between the end of $TOF_{real}+T_{det}$ instant and the start of $TOF_{real}$ instant of the current pulse is known and equals the voltage difference on the output of amplifier 46 between the start and the end of the time window.

Amplitude $I_p$ can therefore be written as follows:

$$I_p = \alpha(V_{int}(TOF_{real}+T_p) - V_{int}(TOF_{real})) + b = a \cdot \Delta V_{int} + b \quad (6)$$

Combining equations (4) and (6) gives equation (2).

Parameters a and b in equation (6) are determined for the pixel during a prior calibration phase by using two uniform radiation sources as a reference; these have a fixed pulse width $T_p$, this pulse width also being that which will subsequently be used during operation of the 3D imaging system.

Parameters $\alpha$ and $\beta$ are also determined during the calibration phase after determining parameters a and b.

To achieve this, two pulses having a different amplitude are emitted and reflected by the same obstacle which is located a known distance d from the pixel in order to illuminate the pixel uniformly. The time of flight is thus measured and therefore known.

For each pulse, the voltage difference $\Delta V_{int}$, which corresponds to the reflected flux measured by the pixel, is measured. Knowing the real time of flight and the amplitude of the pulse from equation (6), it is possible to calculate parameters $\alpha$ and $\beta$.

Alternatively, the time of flight measurement correction is made, without presuming any relationship between the incident flux and detection delay $T_{det}$, by using a predetermined correction table and the flux measurement made by the pixel, i.e. $\Delta V_{int}$.

In the embodiments which have just been described, the time of flight is timestamped by comparator 52 as a function of the voltage delivered by amplifier 46.

However, these elements are not ideal and produce offsets which have an adverse effect on time-of-flight timestamping accuracy. In particular, the output voltages of amplifier 46 and of comparator 52 are contaminated by offsets $V_{offset}^{CTIA}$ and $V_{offset}^{comparator}$ respectively.

Figure 8:
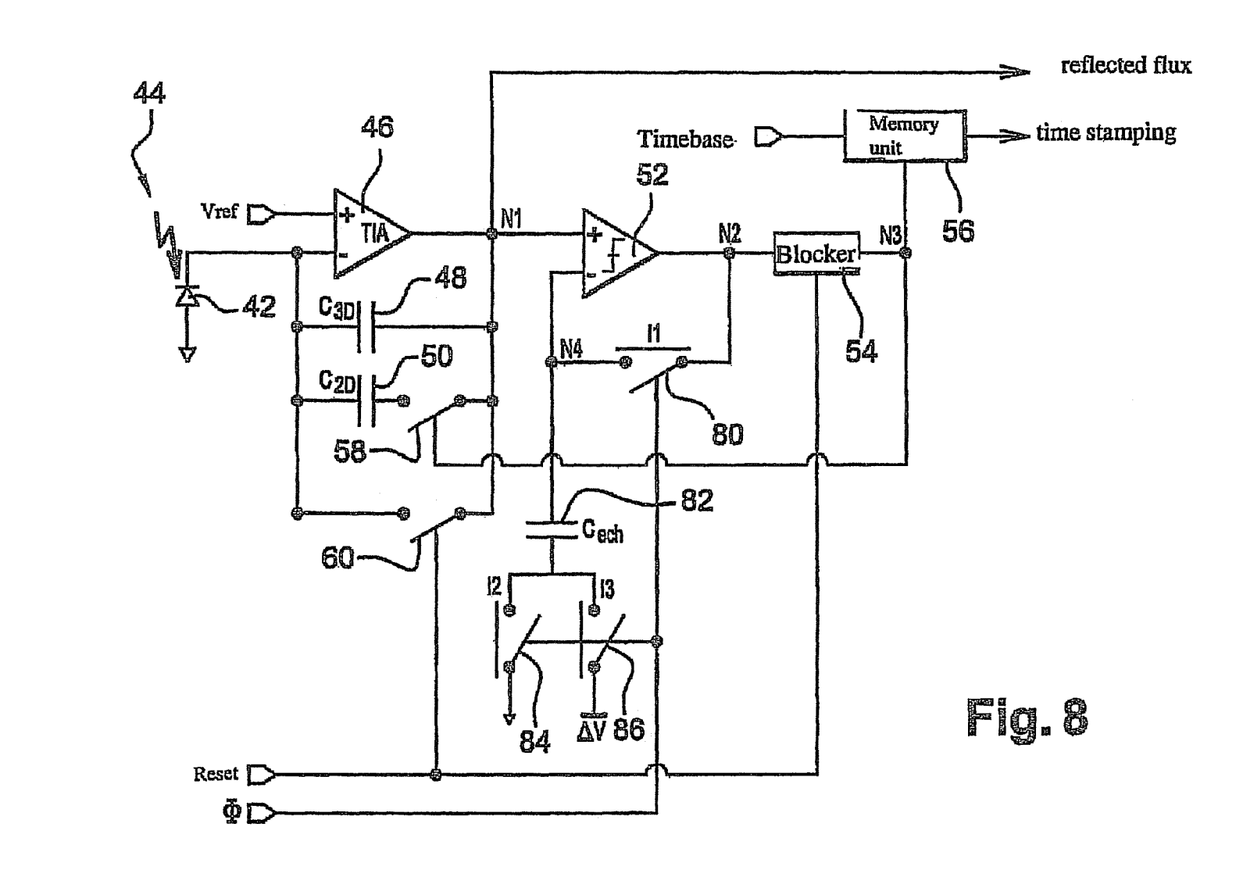
FIG. 8 is a schematic view of a third embodiment of the pixel according to the invention.

The third embodiment shown in FIG. 8 compensates for such offsets.

This third embodiment differs from the first embodiment described in relation to FIG. 3 in that it comprises:
a third switch 80 mounted between the output of comparator 52 and the negative (−) terminal of the latter which is used for the threshold voltage, a third capacitor 82 connected, via one of its terminals, to the negative input (−) of said comparator 52, a fourth switch 84 mounted between the other terminal of capacitor 82 and ground, and a fifth switch 86 mounted between the other terminal of capacitor 82 and the means capable of producing a variation of potential ΔV for each of the terminals of the capacitor $C_{ech}$ when switch 86 is closed (with opening of switch 84).

The third, fourth and fifth switches 80, 84, 86 are also driven by a signal φ in accordance with an offset compensation strategy.

After the reset phase, a first offset compensation phase involves closing the third and fourth switches 80, 84 and opening the fifth switch 86. This establishes, on the negative terminal (−) of comparator 52, a voltage $V_{\phi 1}$ according to the following equation:

$$V_{\phi 1} = V_{ref} + V_{offset}^{CTIA} + V_{offset}^{comparator} \qquad (7)$$

Then, during a second offset compensation phase, the third and fourth switches 80, 84 are opened and the fifth switch 86 is closed. This establishes, on the negative terminal (−) of comparator 52, a voltage $V_{\phi 2}$ according to the following equation:

$$V_{\phi 2} = V_{ref} + V_{offset}^{CTIA} + V_{offset}^{comparator} + \Delta V \qquad (8)$$

Switches 80, 84, 86 then remain in this state in order to measure the incident flux and the time of flight. Voltage $V_{\phi 2}$ is used as threshold voltage $V_{threshold}$, as described earlier.

It is apparent that, because the value of offsets $V_{offset}^{CTIA}$ and $V_{offset}^{comparator}$ is included in threshold voltage $V_{threshold}$, this value compensates any offsets $V_{offset}^{CTIA}$ and $V_{offset}^{comparator}$ which occur on the output of comparator 52. The voltage of amplifier 46, directly obtained by integrating the current produced by photodiode 42, is then compared with voltage $V_{ref} + \Delta V$.

This offset compensation provides not only improved time-of-flight measurement accuracy, thanks to minimised detection delay, and also robustness in terms of the technological dispersion which affects pixels. In fact, the compensation used compensates the real offsets which are present in the pixel.

This compensation also makes it possible to minimise the difference between threshold voltage $V_{threshold}$ and the initial voltage on the positive input of comparator 52 which is connected to amplifier 46 by choosing an appropriate voltage ΔV, for instance by adjusting the value of voltage ΔV as close as possible to the value zero. It should be noted that voltage $V_{ini}$ equals $V_{ref} + V_{offset}^{CTIA}$ and that comparator 52 switches when the voltage difference across its terminals is positive. Consequently, keeping voltage $V_{\phi 1}$ on the inverting terminal (−) of comparator 52 poses a risk of the comparator being triggered inopportunely. Positive voltage ΔV avoids such a risk while minimising the triggering delay.

Note that, in practice, voltage $V_{ini}$, when considered during the compensation phase, also includes the amplifier offset and the effects of the charge injection by switches 58, 60. Thus, the threshold voltage equals $V_{comp} + V_{offset}^{CTIA} + V_{offset}^{comparator}$, with $V_{comp} + V_{offset}^{CTIA}$ being equal to $V_{ini}$ at instant T1 prior to the start of the integration phase.

Finally, although the compensation phase is described above as being subsequent to the reset phase, it can, in contrast, be combined with it.

A fourth embodiment of the pixel according to the invention comprises both detection delay compensation as described in relation to FIG. 7 and offset compensation as described in relation to FIG. 8.

The pixel according to the invention is especially suitable for multimode imaging. In fact, flux measurement and timestamping are performed simultaneously and, in particular, without timestamping measurement influencing flux measurement.

To obtain passive 2D or 3D imaging, it is sufficient to simply disable the portion of the circuit located downstream from the integrator or not to take into account the timestamp value returned by the latter.

An integrator formed by an operational amplifier which is feedback stabilised by switchable capacitors so as to obtain current-to-voltage conversion with variable-gain amplification is described above. It is understood that any type of variable-gain integrator that has an amplification gain before detecting that the threshold voltage of the comparator has been exceeded which exceeds its gain after said threshold is exceeded is suitable. Nevertheless, an integrator formed by an operational amplifier which is feedback stabilised by switchable capacitors is preferable because of its simple design and ease of control.

The invention claimed is:

1. A device comprising:
a photosensitive element producing an electric charge as a function of the radiation incident thereon; and
a circuitry measuring and timestamping an incident radiation on the photosensitive element, said circuitry comprising:
a charge integrator connected to the photosensitive element and converting the charge produced by the photosensitive element to a voltage, wherein said integrator has variable amplification gain:
a comparator comparing the voltage delivered by the integrator with a threshold voltage;
a memory unit storing the instant when the voltage delivered by the integrator exceeds the threshold voltage, wherein said instant is a timestamp or the beginning of the incident radiation on the photosensitive element; and
a circuit controlling the amplification gain of the integrator during an integration time window, wherein said circuit:
sets the amplification gain of the integrator to a first value from the beginning of the integration time window up to the instant when the voltage delivered by the integrator exceeds the threshold voltage; and
sets the amplification gain of the integrator to a second value, lower than the first value, from the instant when the voltage delivered by the integrator exceeds the threshold value up to the end of the integration time window, the integrator thereby integrating all of the charges produced by the photosensitive element during the integration time window.

2. The device as claimed in claim 1:
wherein the integrator comprises an operational amplifier which is feedback stabilized by a first capacitor and a second switchable capacitor, the first capacitor having a capacitance which is less than that of the second capacitor; and
wherein the second capacitor is capable of being connected in parallel with the first capacitor after the instant when the threshold voltage is exceeded.

3. The device as claimed in claim 2, wherein the capacitance of the first capacitor is selected depending on the desired accuracy when determining the instant when the threshold voltage is exceeded.

4. The device as claimed in claim 1, further comprising:
a module for estimating a detection delay which corresponds to the instant when the radiation on the photosensitive element starts and the instant when the threshold voltage is exceeded as a function of the voltage delivered by the integrator, and a module for correcting the instant when the threshold is exceeded by subtracting the determined detection delay from said instant.

5. The device as claimed in claim 4, wherein the module for estimating the detection delay is capable of estimating the detection delay in accordance with the equation:

$$T_{det} = \frac{\alpha}{a \cdot \Delta V_{int} + b} + \beta$$

where $\Delta V_{int}$ is a variation in voltage corresponding to the incident radiation on the photosensitive element and a, b, $\alpha$, and $\beta$ are predetermined parameters.

6. The device as claimed in claim 1, wherein the threshold voltage of the comparator is adjusted to a voltage which is substantially equal to $V_{comps} + V_{offset}^{CTIA} + V_{offset}^{comparator}$, where:

$V_{comp}$ is a predetermined voltage,
$V_{offset}^{CTIA}$ is an offset voltage of the integrator,
and $V_{offset}^{comparator}$ is an offset voltage of the comparator.

7. The device as claimed in claim 6 further comprising:
a first switch capable of connecting the output of the comparator to the threshold voltage input thereof,
a third capacitor having a first terminal connected to a threshold voltage input of the comparator and a second terminal connected to a first terminal of second and third switches, a second terminal of the second switch being connected to ground and a second terminal of the third switch being connected to a predefined potential $\Delta V$,
wherein the threshold voltage of the comparator is adjusted by closing the first and the second switches and opening the third switch, then opening the first and the second switches and closing the third switch.

8. An imaging array comprising a plurality of devices according to claim 1.

9. A 3D active imaging system comprising a controllable radiation source and a detection array capable of detecting radiation originating from said source and reflected by obstacles, wherein the detection array comprises a plurality of devices according to claim 1.

* * * * *